United States Patent [19]
Tsubakida et al.

[11] Patent Number: 6,024,536
[45] Date of Patent: Feb. 15, 2000

[54] DEVICE FOR INTRODUCING AND DISCHARGING COOLING AIR

[75] Inventors: Toshio Tsubakida, Konan; Yoshinori Hashimoto, Koriyama, both of Japan

[73] Assignee: Zexel Corporation, Tokyo, Japan

[21] Appl. No.: 08/976,085

[22] Filed: Nov. 21, 1997

[30] Foreign Application Priority Data

Nov. 21, 1996 [JP] Japan .................................. 8-326117
Mar. 3, 1997 [JP] Japan .................................. 9-063857

[51] Int. Cl.[7] ..................................................... F28F 13/06
[52] U.S. Cl. ..................... 416/189; 416/169 A; 416/192; 416/194; 416/195; 415/210.1; 415/173.6; 415/208.2; 415/211.2
[58] Field of Search ..................................... 415/191, 192, 415/173.1, 173.6, 208.2, 209.4, 210.1, 211.2; 416/189, 192, 194, 195, 169 A

[56] References Cited

U.S. PATENT DOCUMENTS

| | | | |
|---|---|---|---|
| 4,358,245 | 11/1982 | Gray ........................................ | 416/189 |
| 4,548,548 | 10/1985 | Gray, III .................................. | 416/189 |
| 4,569,632 | 2/1986 | Gray, III .................................. | 416/189 |
| 5,244,347 | 9/1993 | Gallivan et al. ......................... | 416/189 |
| 5,297,931 | 3/1994 | Yapp et al. ............................. | 415/208.1 |
| 5,342,167 | 8/1994 | Rosseau .................................. | 415/119 |
| 5,466,120 | 11/1995 | Takeuchi et al. ....................... | 415/119 |
| 5,624,234 | 4/1997 | Neely et al. ............................. | 416/238 |
| 5,758,716 | 6/1998 | Shibata .................................... | 165/41 |

*Primary Examiner*—Edward K. Look
*Assistant Examiner*—Matthew T. Shanley
*Attorney, Agent, or Firm*—Wenderoth, Lind & Ponack, L.L.P.

[57] ABSTRACT

The object of the invention is to prevent the quantity of airflow by a fan from decreasing in dependence on the distance between the fan and obstacles such as an engine in a device for introducing and discharging cooling air having a shroud with a high covering rate. In the device for introducing and discharging cooling air having the shroud with the high covering rate, an airflow direction changing member is provided downstream of the fan, and each fixed blade of the member has a shift angle in the radial direction and an attack angle in a rotation direction of the fan, so that the air tends to be discharged outward in the radial direction.

24 Claims, 14 Drawing Sheets

ROTATION DIRECTION OF FAN

ROTATION DIRECTION OF FAN

ADVANCE DIRECTION OF FAN

A:BOTH K1 AND K2 ARE LARGE

C: K1 IS LARGE, K2 IS SMALL

D: K1 IS SMALL, K2 IS LARGE

COVERING RATE $\left(K=\dfrac{Y}{X}\times 100\right)$

COVERING RATE IS HIGH

COVERING RATE IS LOW

SHROUD COVERING RATE TO FAN $$\left(K1 = \frac{Y}{X} \times 100\right)$$

RING COVERING RATE TO BLADE $$\left(K2 = \frac{Y}{X} \times 100\right)$$

DEVICE FOR INTRODUCING AND DISCHARGING COOLING AIR

BACKGROUND OF THE INVENTION

This invention relates to a device, including a fan and a fan shroud, for introducing cooling air through a heat exchanger and discharging the cooling air so as to increase the cooling effects of the cooling air when the heat exchanger is located in front of an engine in an automotive vehicle.

Recently, it has become important in automotive vehicles to make the engine room or compartment smaller in order to allow the passenger compartment to be made as large as possible without increasing the overall size of the vehicle. Further, various kinds of accessories, such as a condenser and a compressor for an air conditioner, a compressor for a power steering, an ABS (Anti-lock Brake System) and so on, are located in the engine room. Thus, a space occupied by the fan, the engine behind the fan, and the accessories must be made as small as possible. A fan must be provided for cooling the condenser and the radiator. Airflow is created by rotation of the fan, and the heat of the radiator and the condenser is radiated into the airflow. Generally, air introduced from a front end of the vehicle flows through the condenser and the radiator and is discharged from the back of the fan into the engine compartment.

For improving a cooling effect of the fan, a shroud is provided between the cooled devices and the fan, so that the air utilized for heat exchange from e.g. the condensor and radiator is guided by the shroud and discharged directly to the engine and other devices. A "covering rate" of the shroud represents the axial proportion of the fan covered by the downstream end of the shroud. As shown in FIG. 20, the covering rate K is defined by the function $K=Y/X \times 100$. FIGS. 21A and 21B respectively show a fan with a high covering rate and a fan with a low covering rate. As shown in FIGS. 21A and 21B, in the fan with the high covering rate, air turbulence is small adjacent the outer periphery of the fan, because the fan is covered with the shroud so that wraparound of air from a positive pressure surface to a negative pressure surface is small. Air discharged from the fan is prevented by the shroud from spreading in the radial direction, so that the air tends to be discharged straight backward. However, when the covering rate is from 60% to 70% or less as shown in FIG. 21B, the discharged air is not influenced by the distance between the fan and the engine etc., as shown by a chain line (alternate long and two short dashes) in FIG. 19. This is because discharged air of the fan spreads in the radial direction of the fan (See FIG. 21B).

However, when the covering rate is high (80% or more), as shown in FIG. 21A, air turbulence becomes small in the outer periphery portion of the fan, so that advantages such as decreased noise, improved cooling effect of the fan and so on are achieved. However, as shown in FIG. 19, the influence of the distance between the fan and the engine structure or the like becomes large (solid line in FIG. 19). This is because it is difficult for the discharged air to spread in the radial direction as compared with the case in which the covering rate is low, and the air strongly tends to be discharged straight backward (see FIG. 21A). Thus, the discharged air collides with the structures such as the engine or the like (i.e. obstacles) so that the cooling effect of the discharged air is reduced thereby requiring the fan to be driven with greater frequency and resulting in greater energy usage. In particular, as a result of research into the performance of various kinds of the fans, it was recognized that the quantity of the airflow decreased considerably as shown by the solid line in FIG. 19 when the distance between the fan and the obstacles, especially the engine, is less than about 200 mm.

A fan, in which outer peripheral portions of the blades are connected by a cylindrical ring, that is, a ring fan, has two kinds of covering rates. First, a ring covering rate K2 indicates the axial proportion of the blade covered by the ring, as shown in FIG. 23, and this ring covering rate K2 is represented by the function $K2=Y/X \times 100$.

Second, a shroud covering rate K1 indicates the axial proportion of the fan covered by the shroud. This shroud covering rate K1 is represented by the function $K1=Y/X \times 100$, as shown in FIG. 22. These covering rates K1 and K2 for the ring fan have the same effects and problems as discussed above for the shroud covering rate.

In a prior art PCT Patent Publication S61-502267, a fixed member is located behind a fan. The fixed member has a control surface for removing the airflow component in a rotation direction to allow the air to discharge straight along the axial direction of the fan. However, it is clear that, in this prior art arrangement, discharged air is directly influenced by the distance between the fan and obstacles, such as an engine, such that it will experience a decrease of the quantity of discharged air when the obstacles are near the fan.

SUMMARY OF THE INVENTION

The object of the invention is to prevent a decrease in the quantity of airflow discharged by a fan by providing an airflow direction changing member for changing the airflow direction of air discharged from the fan, in a device for introducing and discharging cooling air with a fan having a high covering rate, and more particularly in a fan device positioned in an engine room of a vehicle.

Accordingly, this invention provides a device for introducing a cooling air through a heat exchanger and discharging the cooling air, comprising: a fan including rotatable blades rotatable about a rotation axis, and a fan motor operably coupled to the rotatable blades for driving the fan; a shroud for forming an airflow passage from the heat exchanger to the fan; and an airflow direction changing member provided downstream of the fan. The airflow direction changing member comprises a center boss portion and a plurality of fixed blades having radially inner ends secured on the boss portion, the fixed blades radiate from the center boss portion in a generally radial direction, the fixed blades have radially outer ends fixed together in a circumferential series, and the fixed blades are fixed in position such that the rotatable blades are rotatable about the rotation axis relative to the fixed blades. Each of the fixed blades has a shift angle constituted by an angle between a first datum line extending from a center of the boss portion through a center of the radially inner end of the fixed blade and a second datum line extending from the center of the boss portion through a center of a radially outer end of the fixed blade. The second datum line is circumferentially advanced relative to the first datum line in a rotation direction of the fan. Each of the fixed blades has an attack angle constituted by an angle between a third datum line extending along a chord of the fixed blade in the rotation direction of the fan and a datum surface extending along the rotation direction of the fan.

By this constitution, discharged air from the fan is changed in its discharge direction so as to flow radially outward so as to overcome the problem of the quantity of airflow being decreased when the distance between the fan and obstacles such as an engine is small.

The fan may be a ring fan which has a ring, connecting circumferentially in series, radially outermost portions of the rotatable blades of the fan.

The shift angle between the innermost portion (i.e. the radially inner end) and the outermost portion (i.e. the radially outer end) of the fixed blade is in a range of about 30° to about 60° in the rotation direction of the fan. At least 40% of the fixed blade is formed at the shift angle, and the attack angle is from 30° to 70°. The fixed blade is wing-shaped in cross section.

This may considerably decrease the energy loss caused by collision of the discharged air against the obstacles such as the engine.

The airflow direction changing member may be independent from the shroud or be formed unitarily with the shroud. Especially, if it is made of resin, it is possible to produce a complex shape exactly and easily. When the airflow direction changing member is formed independently from the shroud, it is attached with the fan motor. When the airflow direction changing member is formed unitarily with the shroud, it may be combined with a fixed plate of the fan motor.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENT

An embodiment of this invention will now be explained with reference to the drawings.

Figure 1:
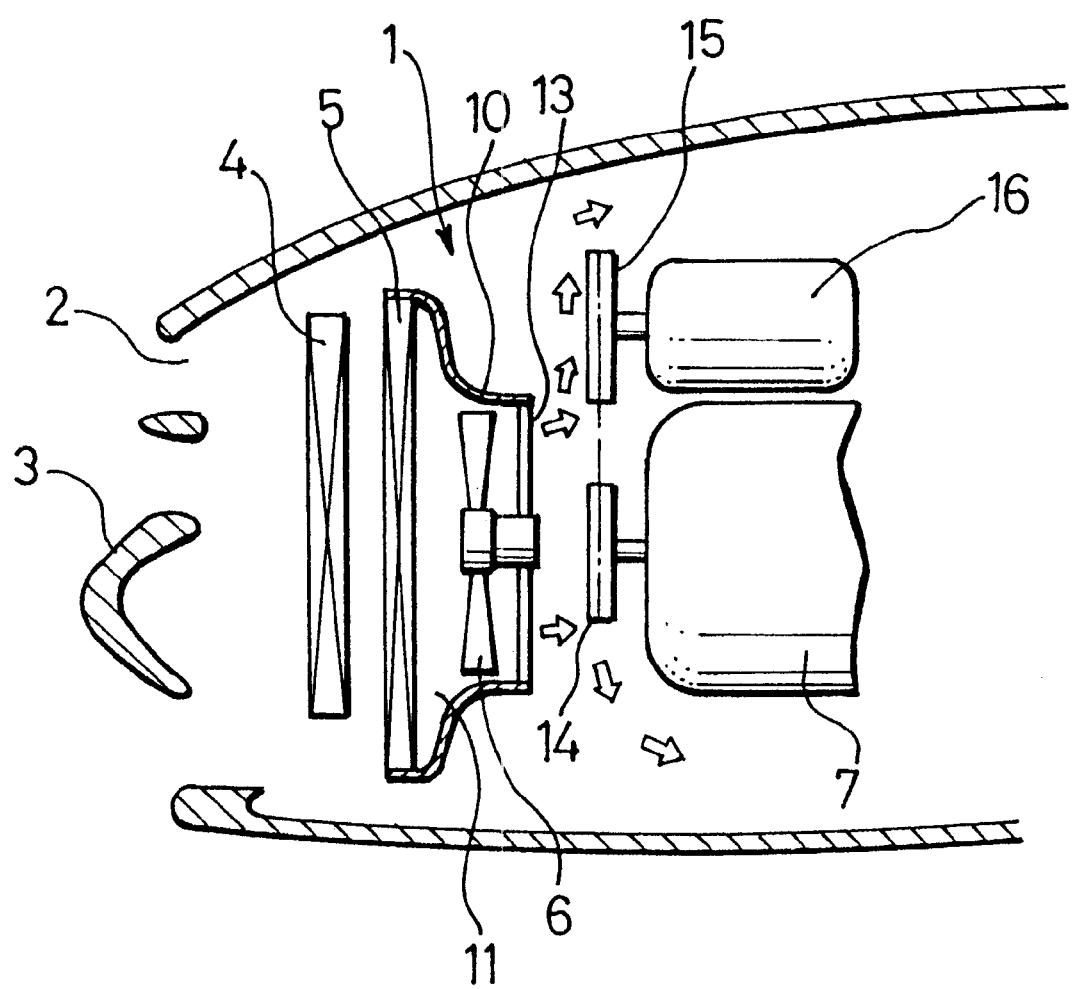
FIG. 1 is a cross-sectional view illustrating an engine room provided with a device for introducing and discharging cooling air according to the present invention.

In FIG. 1, a cross-sectional view of an engine room 1 in a vehicle is shown. An air intake opening 2 is provided at a front of the engine room 1, and a grill 3 is mounted over the air intake opening 2. Next to the grill 3, a condenser 4 constituting a cooling cycle of an air conditioner is provided, and behind the condenser 4, a radiator 5 is provided which cools the cooling water of an engine 7. Furthermore, behind the radiator 5, a fan 6 is provided. A shroud 10 is provided between the radiator 5 and the fan 6, and an airflow passage 11 is formed by the shroud 10.

The fan 6 is an axial-flow fan, which creates airflow in a direction parallel to a rotation axis of the fan as driven by a motor. By rotation of the fan 6, cooling air is introduced from the grill 3, the cooling air cools the heat exchanger, that is, the condenser 4 and the radiator 5, and then the cooling air flows through the airflow passage 11 and is discharged to devices including the engine 7, etc. in the engine room 1.

An airflow direction changing member 13 is provided behind the fan 6, by which the airflow direction of the discharged air is changed so that the air is discharged smoothly in a discharge direction. Note that reference numbers 14 and 15 indicate pulleys, and 16 indicates an accessory, such as a compressor.

Figure 2:
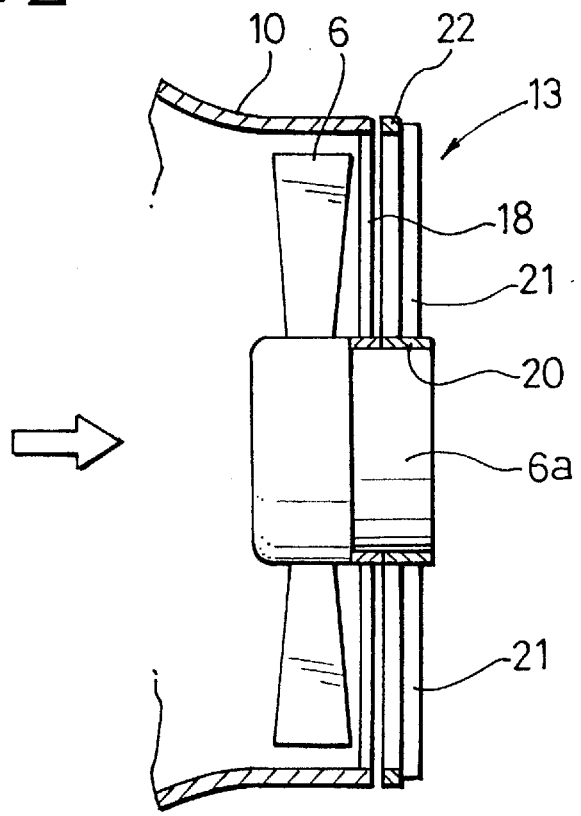
FIG. 2 is a cross-sectional view illustrating the relationship between a fan in the rear of a shroud and an airflow direction changing member.
Figure 3:
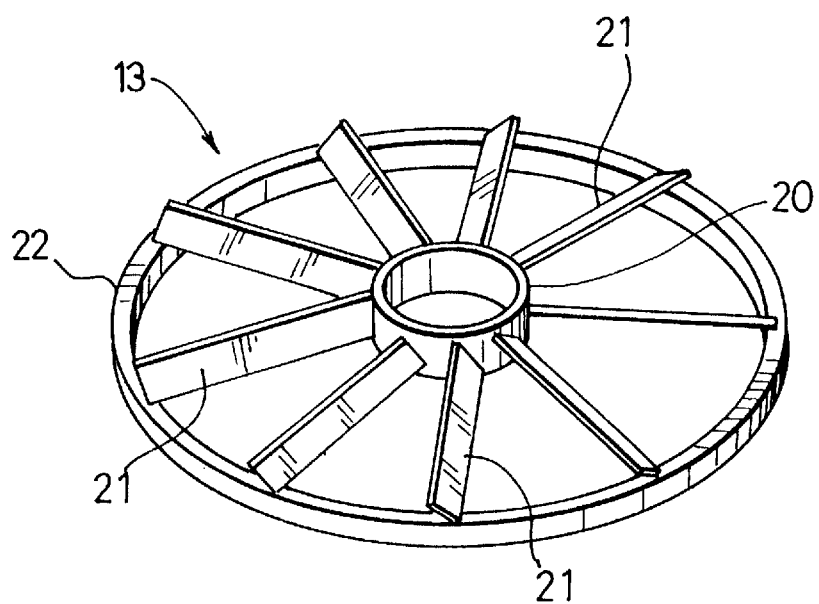
FIG. 3 is a perspective view of the airflow direction changing member.

As shown in FIGS. 2 and 3, the fan 6 is attached in the back end of the shroud 10 by an attaching plate 18 which is engaged outside of a fan motor 6a. The member 13 has a boss portion 20 at a center thereof, nine fixed blades 21 extend from the boss portion 20 in radial directions, and a reinforcing ring 22 connects with outermost portions of the fixed blades 21. Each of the fixed blades 21 of the member 13 has "a shift angle". To explain the shift angle, reference is made to FIG. 4. A line extending from a center point of rotation PO through a middle point P1 of an innermost (i.e. radially innermost) portion of the fixed blade 21 is a first datum line L1, and a line positioned forward in the rotation direction of the fan 6 and extending from the center point PO through a middle point P2 of an outermost (i.e. radially outermost) portion of the fixed blade 21 is a second datum line L2. An angle between the first datum line L1 and the second datum line L2 constitutes a shift angle β.

Figure 5:
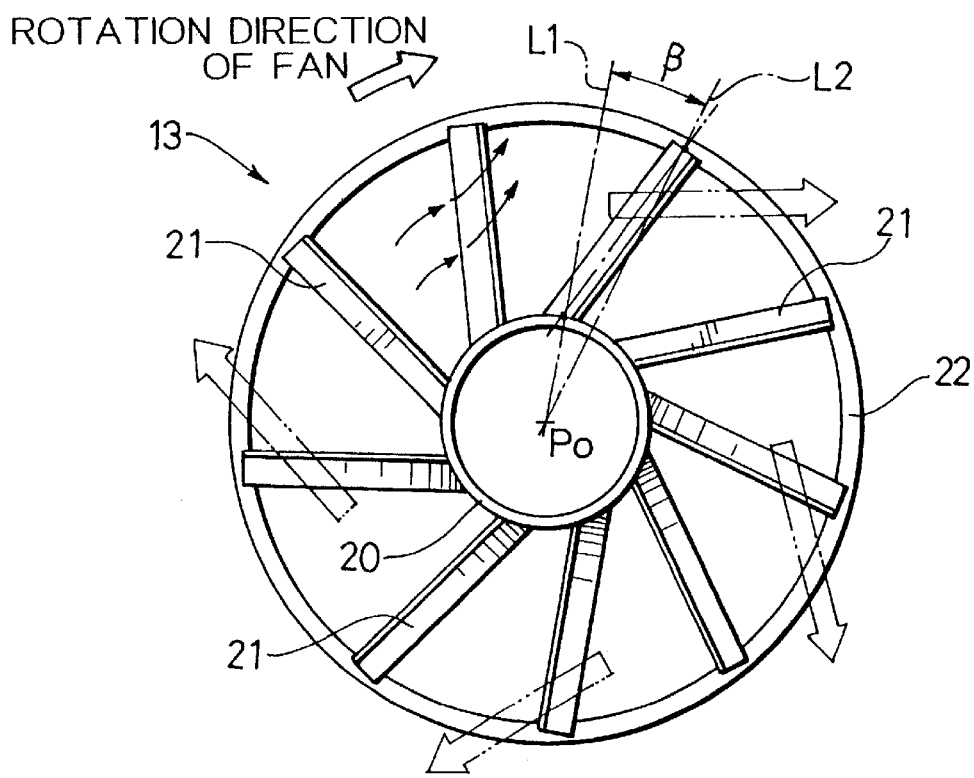
FIG. 5 is a front plan view of the airflow direction changing member.

Concretely speaking, in the embodiment, the outermost portion of the fixed blade 21 of the member 13 is advanced in the circumferential direction relative to the innermost portion of the fixed blade 21 by the shift angle β. Movement of the discharged air by the fan 6 is indicated by the solid line arrows shown in FIG. 5. Note that FIG. 5 is a view in the axial direction, so that the solid line arrows do not illustrate components of the air movement in the axial direction. Immediately after passing through the fan 6, the main components of the discharged air movement are in the axial direction and the circumferential (or rotation) direction, and the radial component of the discharged air movement is less due to the shroud 10.

Then, the discharged air which collides with the fixed blade 21 flows along the fixed blade 21. Here, the outermost portion of the fixed blade 21 is advanced in the rotation direction relative to the innermost portion thereof, so that discharged air which collides with the fixed blade 21 spreads in the radial direction along the fixed blade 21. That is, a radial factor component of airflow is added to the discharged air. In FIG. 5, the solid line arrows indicate movement of the air flowing along the fixed blade 21 immediately after discharge from the fan 6, and the phantom line arrows in FIG. 5 indicate total flow of the discharged air after the airflow direction has been changed by the fixed blade 21.

Figure 6:
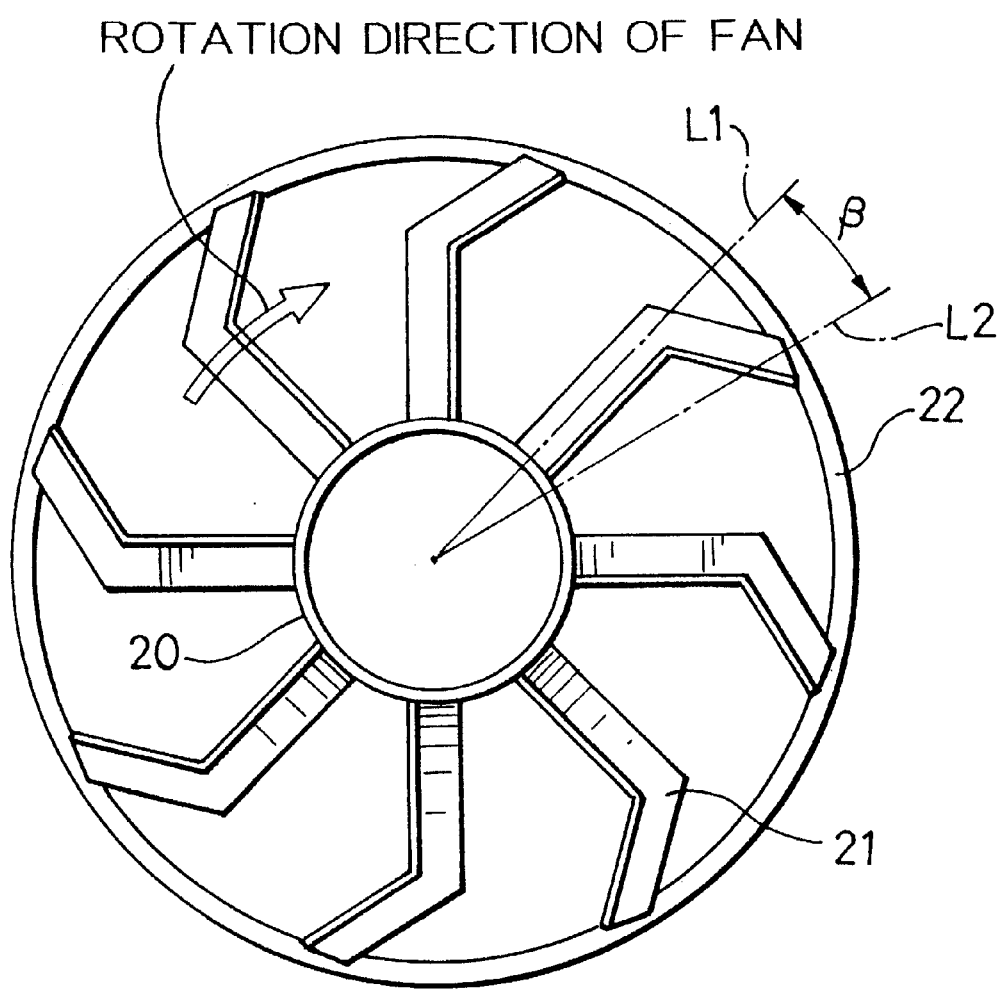
FIG. 6 is a front plan view showing a fixed blade of the airflow direction changing member which is shifted by a shift angle over only part of its length.

In a preferred form of the fixed blades 21, the entire length of each of the fixed blades 21 extends at the shift angle β from the innermost portion P1 to the outermost portion P2 thereof so as to attain the greatest effect. However, as a result of experiments by the inventors, it has been found that good results are also attained when only a portion of each of the fixed blades is shifted by the rotational shift angle β so as to extend from the first datum line to the second datum line L2, as illustrated in FIG. 6. In particular, it was found that good results are attained when at least 40% of the length of each of the fixed blades constitutes the shifted portion (i.e. the length of each of the blades extending from the first datum line L1 to the second datum line L2 thereof), and that further obvious gains are made when at least 70% of the length of each of the blades 21 constitute the shifted portion thereof. FIG. 6 illustrates an embodiment in which 40% of the length of each of the blades constitutes a shifted portion.

Figure 7:
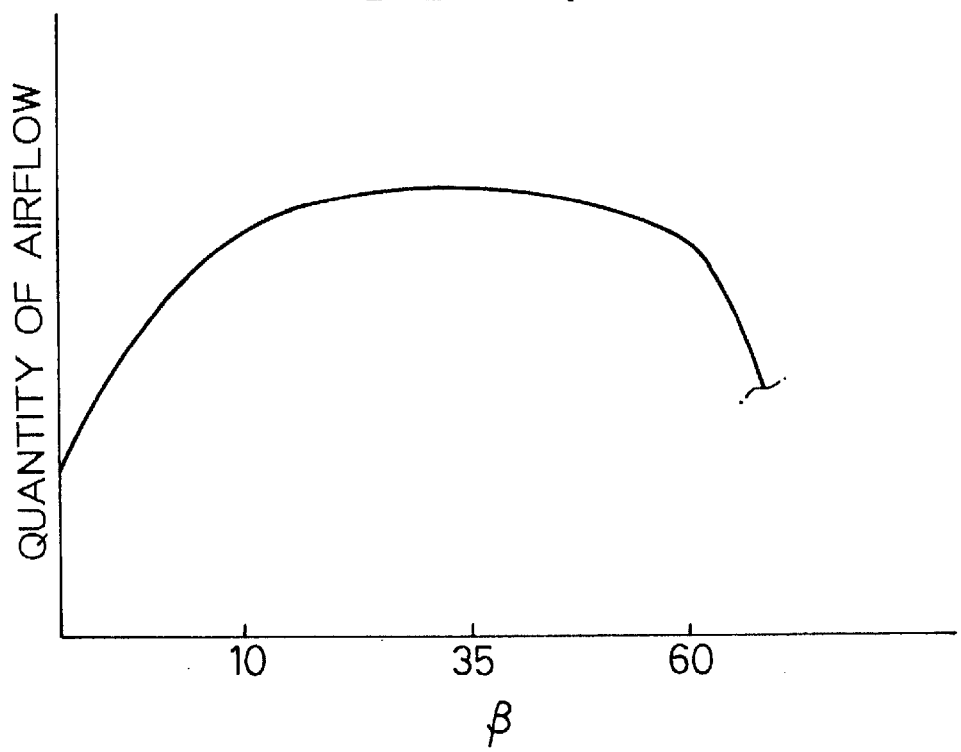
FIG. 7 is a graph showing the relationship between the quantity of airflow and the shift angle β of the fixed blade of the airflow direction changing member.

FIG. 7 shows a graph of the results of experiments by the inventors when the shift angle β was varied. In particular, FIG. 7 illustrates that the quantity of airflow attained is large when the shift angle β is varied within the range of 10° to 60°.

Figure 9:
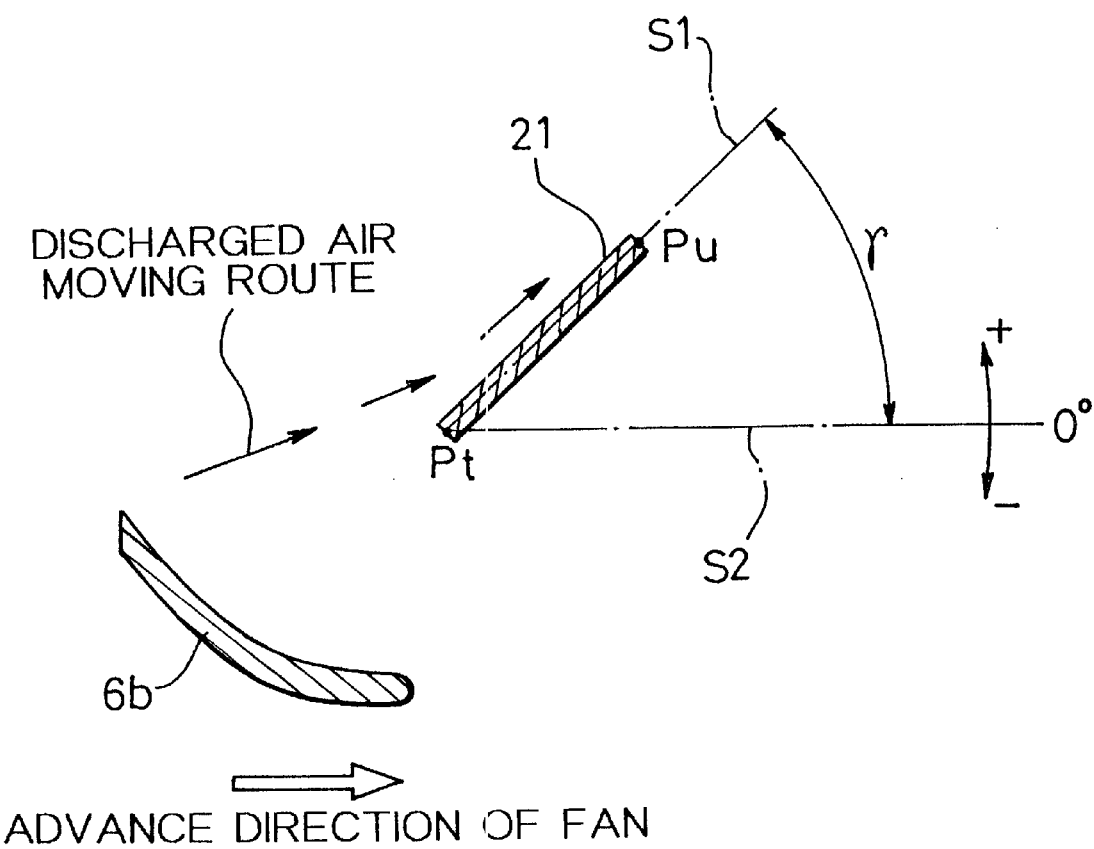
FIG. 9 is a cross-sectional view of the fixed blade showing the attack angle γ.
Figure 15:
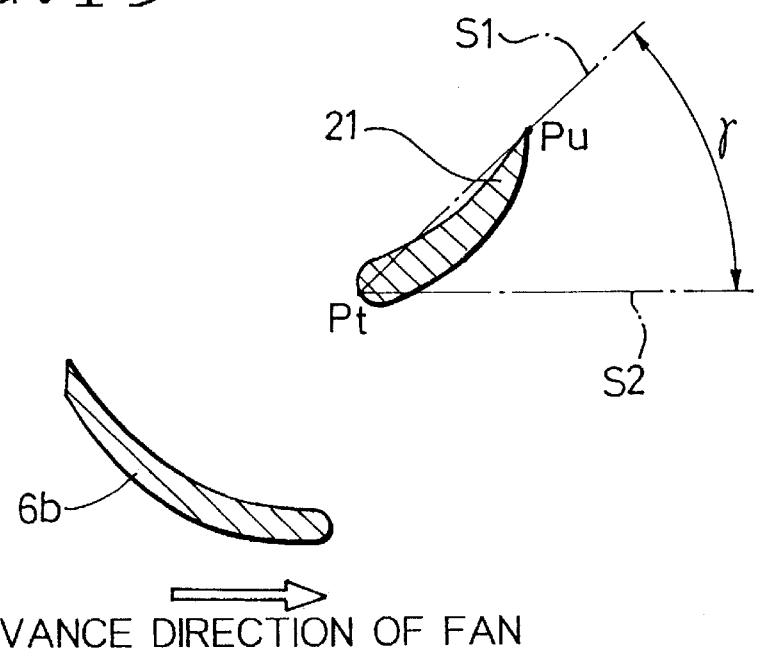
FIG. 15 is a cross-sectional view showing the attack angle γ for a modified form of the fixed blade of the airflow direction changing member.

FIG. 9 is a cross-sectional view through one of the fixed blades 21 and a portion of the fan 6 on a cylindrical surface having a central axis being the same as a rotation axis of the fan 6. In this specification, an angle between the fixed blade 21 (a datum line S1 extending from Pt through Pu in FIG. 9) and a datum surface S2 extending in the radial direction is called an attack angle (indicated by γ). FIG. 9 shows an embodiment in which a cross-sectional shape of the fixed blade 21 is linear, but the cross-sectional shape of the fixed blade 21 can be an arch-shape and, in this case, the attack angle is defined between the lines S1 and S2 where the line S1 is constituted by a chord connecting both ends (Pu, Pt: shown in FIG. 15) in the cross-sectional view of the fixed blade. Note that, in accordance with a convention shown in FIG. 9, an attack angle γ of 0° is defined when S1 is coincident with S2, and a positive attack angle γ is defined when line S2 extends in a direction downward of the discharged air discharged by the fan.

Figure 8:
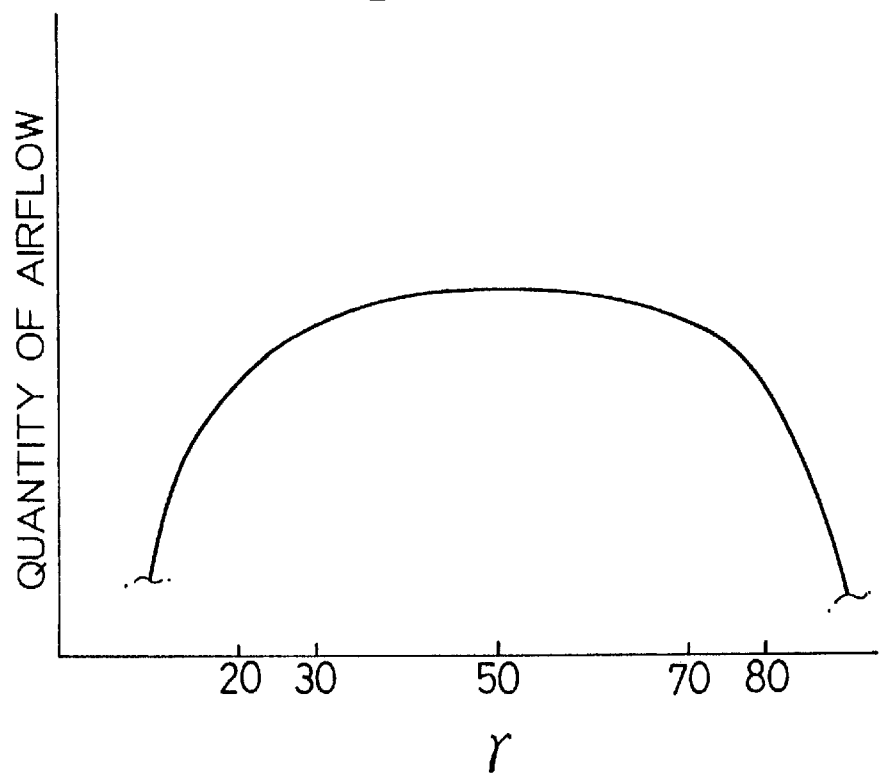
FIG. 8 is a graph showing the relationship between the quantity of airflow and an attack angle γ of the fixed blade of the airflow direction changing member.

As shown in FIG. 9, the attack angle γ is set within a range of 30° to 70°, so that the discharged air of the fan collides with the fixed blade and flows along the fixed blade smoothly. As a result, spread of the airflow in the radial direction of the discharged air as mentioned above will occur with certainty. FIG. 8 shows a graph of results attained when the inventors varied the attack angle γ under otherwise identical conditions and measured the quantity of the airflow. The results show that the quantity of the airflow is large within a range of attack angles of approximately 30° to 70°.

When the attack angle γ is 80° or more, a turning angle of the airflow is large and energy loss increases. When the attack angle γ is 20° or less, the turning angle is too small to sufficiently control the airflow direction, and resistance of airflow is too large to intake a sufficient quantity of the air when the fan is not driven, such that the frequency with which the fan must be driven is high thereby undesirably causing an increase in the consumption of electric power.

Figure 19:
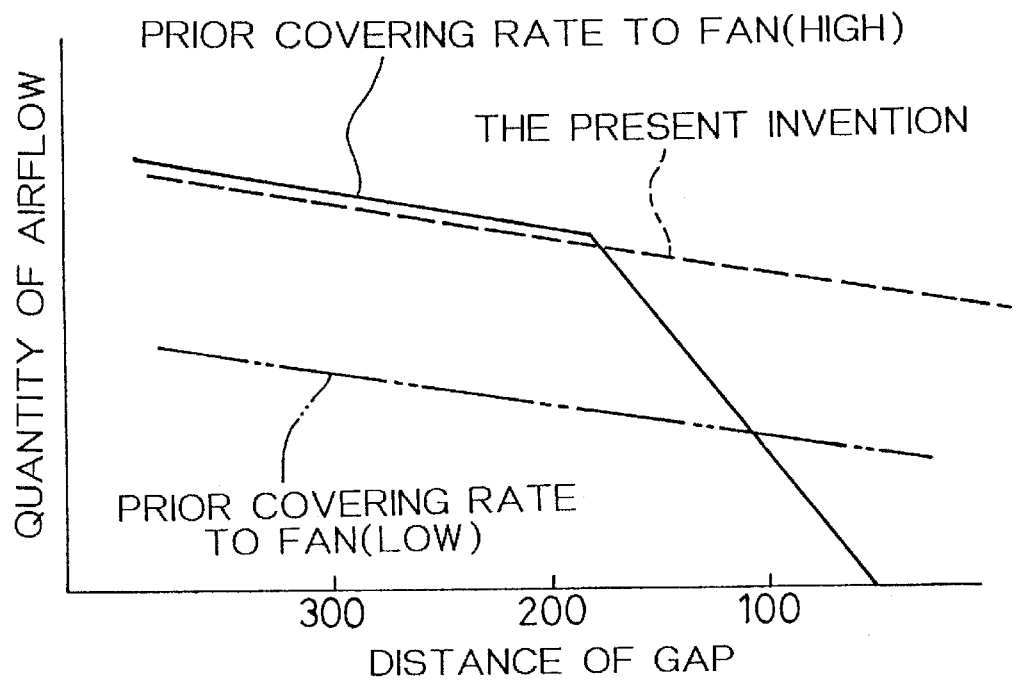
FIG. 19 is a graph showing the relationship between the quantity of airflow and the distance between the fan and an obstacle such as an engine.
Figure 20:
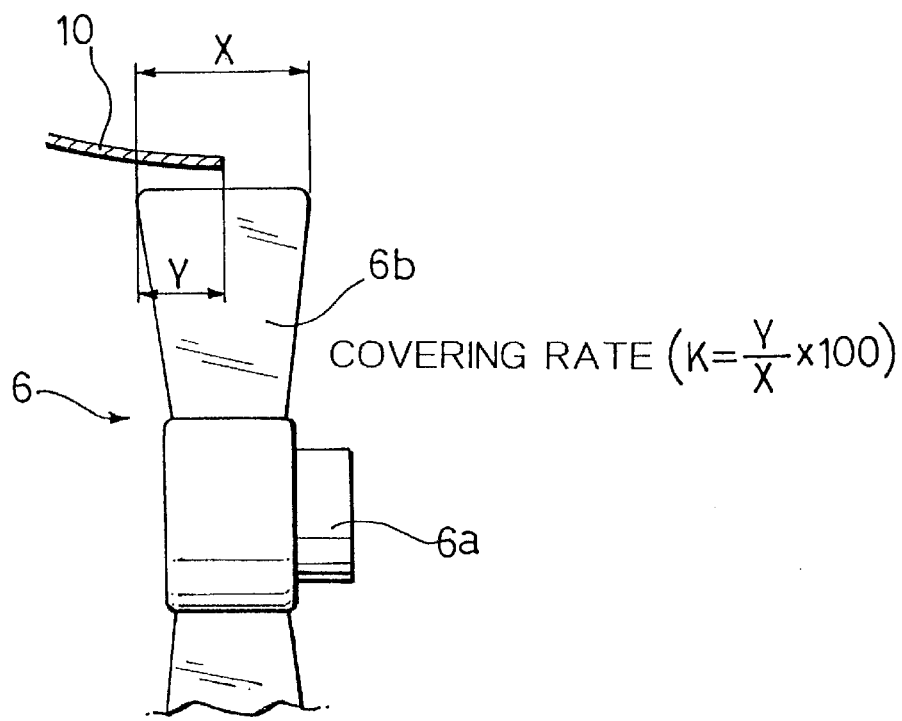
FIG. 20 is an illustration for explaining the covering rate between a back end of the shroud and the fan.
Figure 21A:
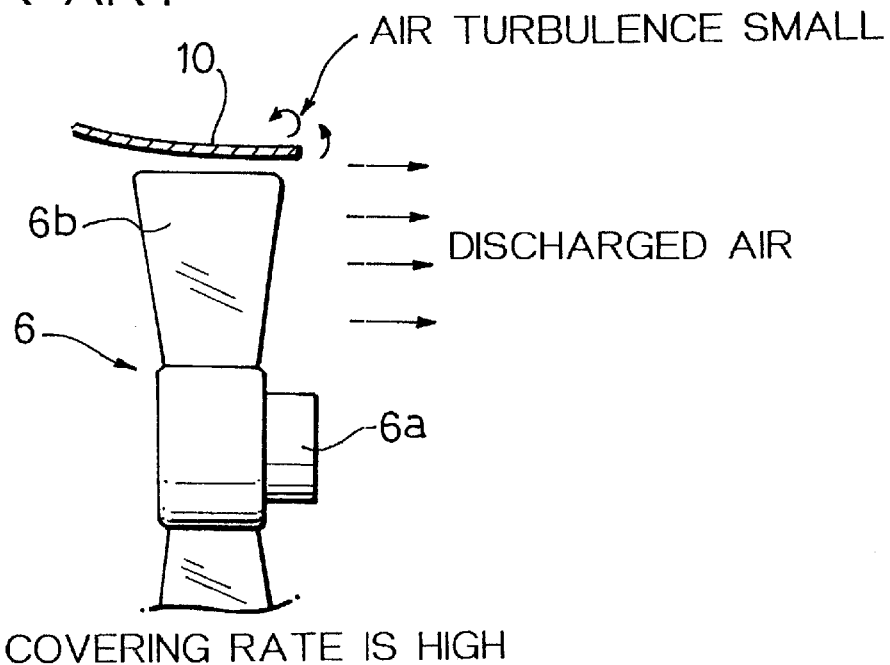
FIGS. 21A and 21B are illustrations showing relationships between a shroud covering rate and air discharge direction.
Figure 21B:
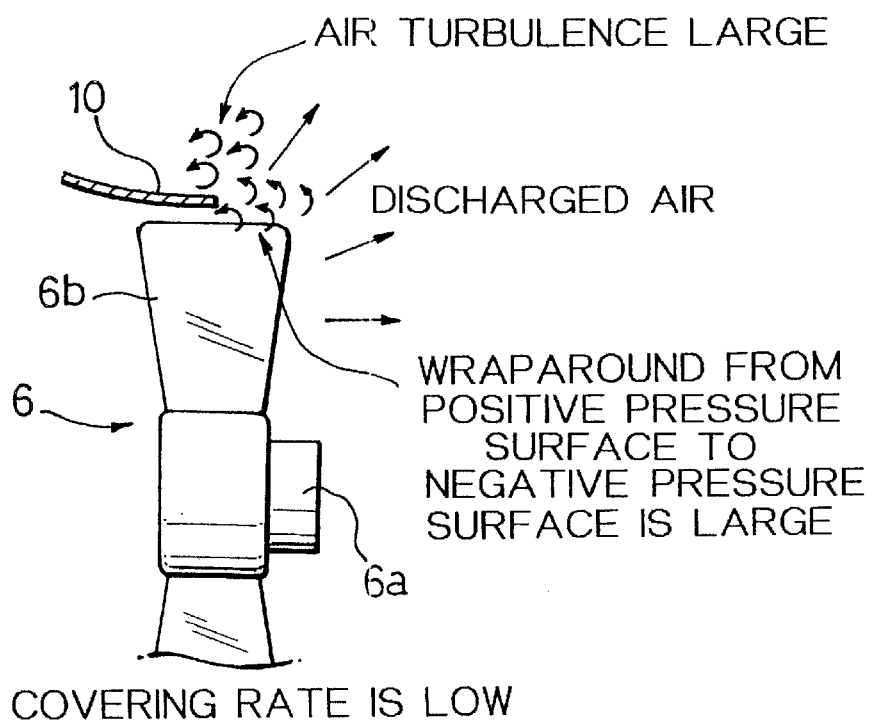
Figure 22:
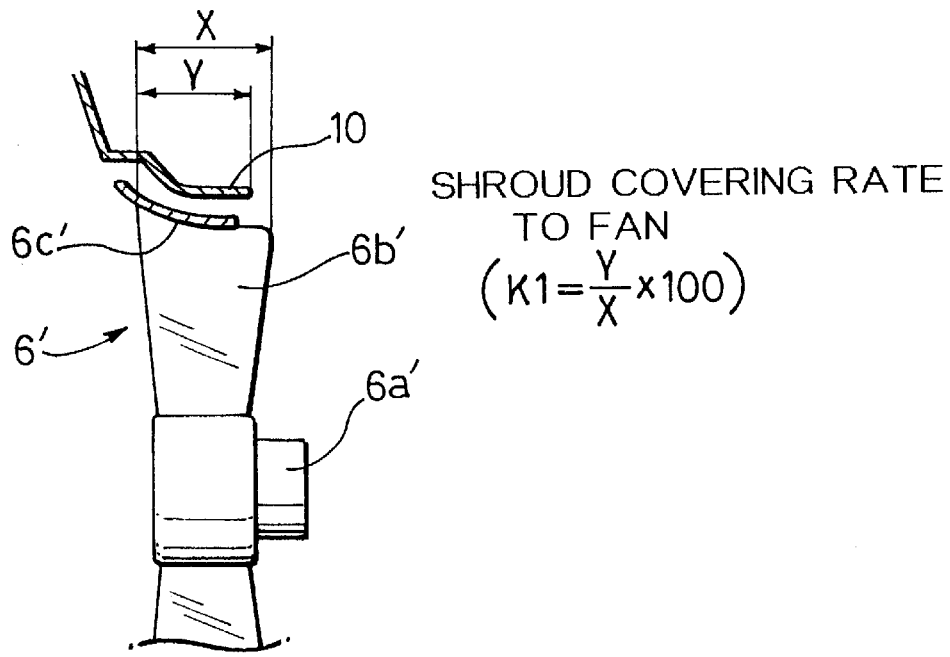
FIG. 22 is an illustration for explaining a shroud covering rate for a ring fan.
Figure 23:
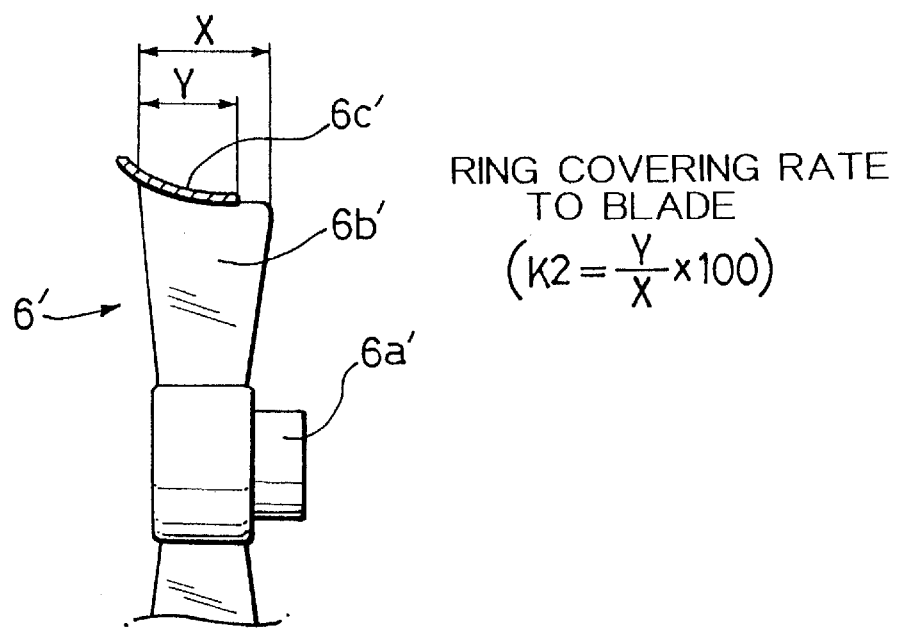
FIG. 23 is an illustration for explaining a ring covering rate for a ring fan.

Influence of an obstacle on the discharged air of the fan is shown in FIG. 19. FIG. 19 shows a graph indicating the results of an experiment. In the experiment, the inventors provided a resistance member (e.g. to represent engine structure) behind the fan as an obstacle to the airflow and researched the quantity of the airflow by setting various distances between the fan and the resistance member. By this graph, it is found that the influence of the distance between the fan and the resistance member is small in a prior fan with a low covering rate as shown with a chain line (i.e. line formed with alternate long and two short dashes), but energy loss by air turbulence in the outer periphery of the fan is large, so that the quantity of airflow is small overall.

To the contrary, in a prior fan with a high covering rate, as shown with a solid line in FIG. 19, the quantity of the airflow is large when the distance is large, but when the distance is about 200 mm and below, the influence of the distance becomes large and the quantity of the airflow decreases considerably, so that the quantity of airflow is smaller than that of the prior fan with the low covering rate for specific distances. On the other hand, as shown with a broken line, the quantity of the airflow for the present invention is large overall and the influence of the distance is small, so that there is no instance in which the prior fan with the low covering rate is superior to the present invention.

Figure 10:
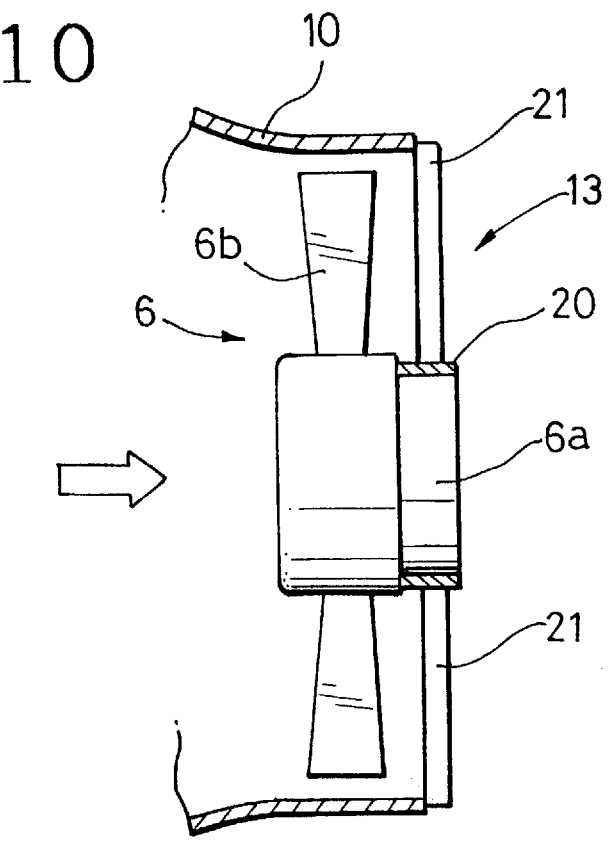
FIG. 10 is a cross-sectional view showing the airflow direction changing member formed unitarily with a back end of the shroud, and showing the fan mounted to the airflow direction changing member.
Figure 11:
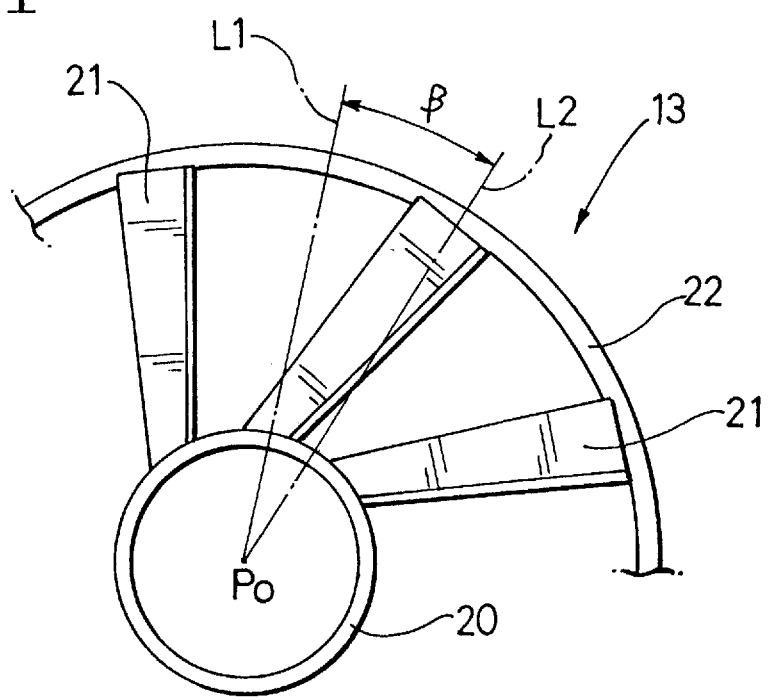
FIG. 11 is an illustration showing a modified embodiment of the fixed blade of the airflow direction changing member and an axial airflow speed distribution thereof.

In another embodiment of attaching the airflow direction changing member 13, as shown in FIG. 10, the airflow direction changing member 13 is formed unitarily with the rear end of the shroud 10, wherein the front ends of the fixed blades 21 are secured on the rear end of the shroud 10 and the fan motor 6a of the fan 6 is inserted into the boss portion 20 to support the fan 6.

Other modified forms of the airflow direction changing member 13 are shown in FIGS. 11 through 15. In the member 13 shown in FIG. 11, the fixed blades 21 are formed to increase in width in an outward radial direction, so as to increase an effect of oblique flow.

Figure 12:
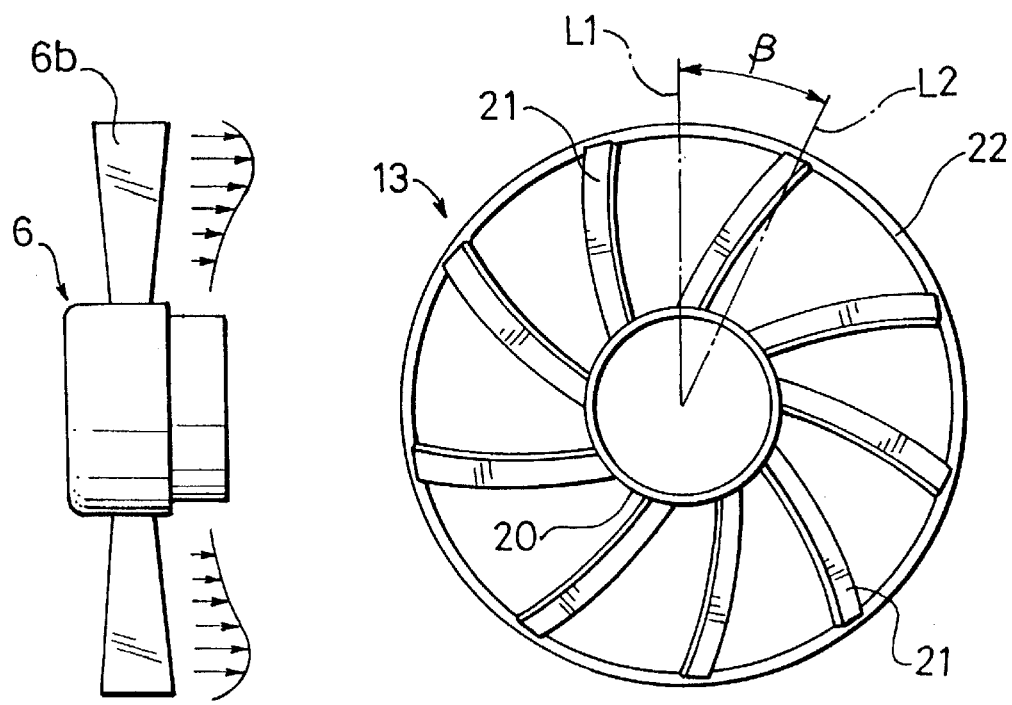
FIG. 12 is an illustration showing another modified embodiment of the fixed blade of the airflow direction changing member and an axial airflow speed distribution thereof.
Figure 13:
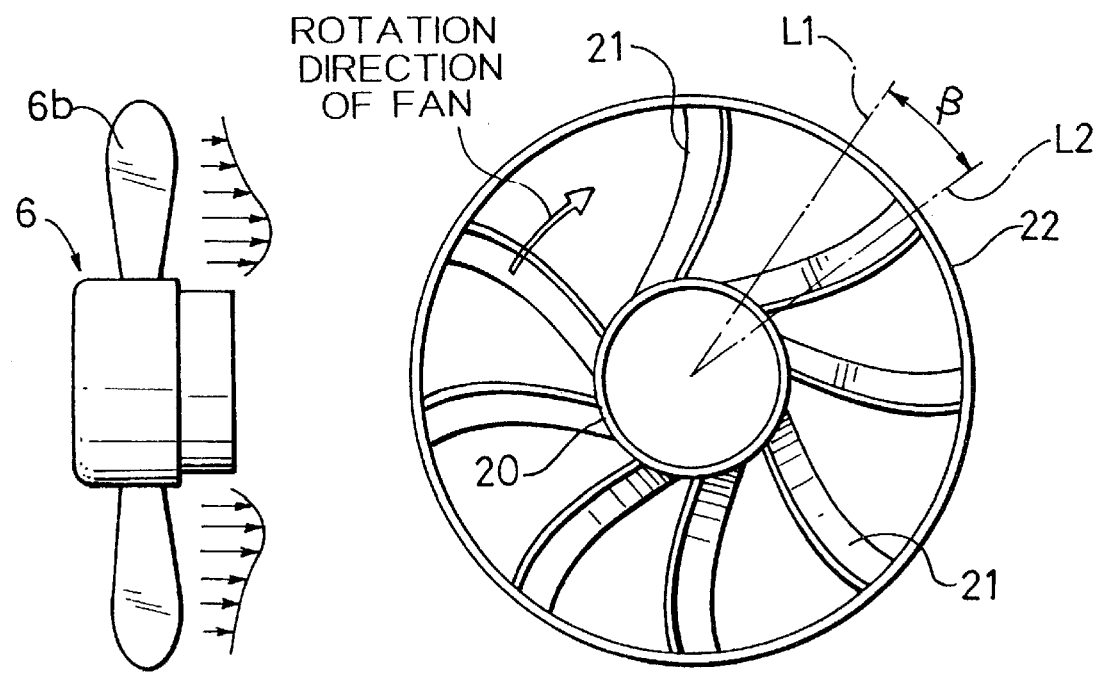
FIG. 13 is an illustration showing another modified embodiment of the fixed blade of the airflow direction changing member, and an axial airflow speed distribution thereof.

FIGS. 12 and 13 show forms of the member 13 with blades 21 modified in accordance with conditions of axial airflow speed distribution in the radial direction for various kinds of the fan 6. In FIG. 12, the fixed blade 21 is formed in an arch-shape which is concave in the rotation direction to increase the effect of the oblique flow at the radially outer side. That is to say, it is effective when the axial air flow is large at the radially outer side of the fan.

FIG. 13 shows an embodiment in which the fixed blade 21 is formed in an arch-shape which is convex in the rotation direction to increase the effect of the oblique flow at the radially inner side. That is to say, it is effective when the axial air flow is large at the radially inner side of the fan.

Figure 4:
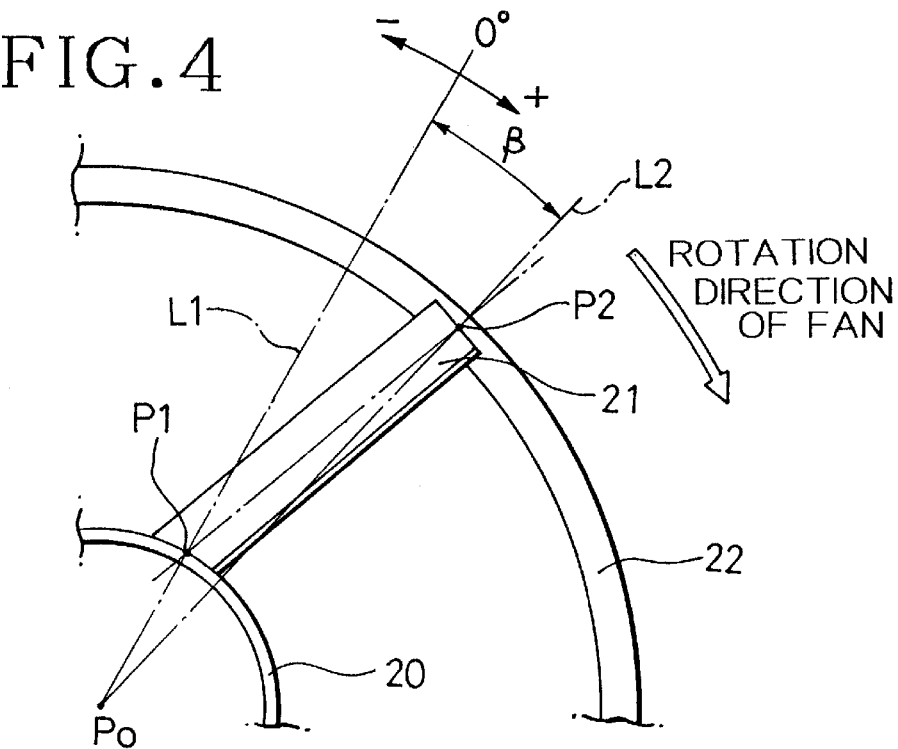
FIG. 4 shows a part of the airflow direction changing member and is an illustration for explaining a shift angle of a fixed blade thereof.
Figure 14:
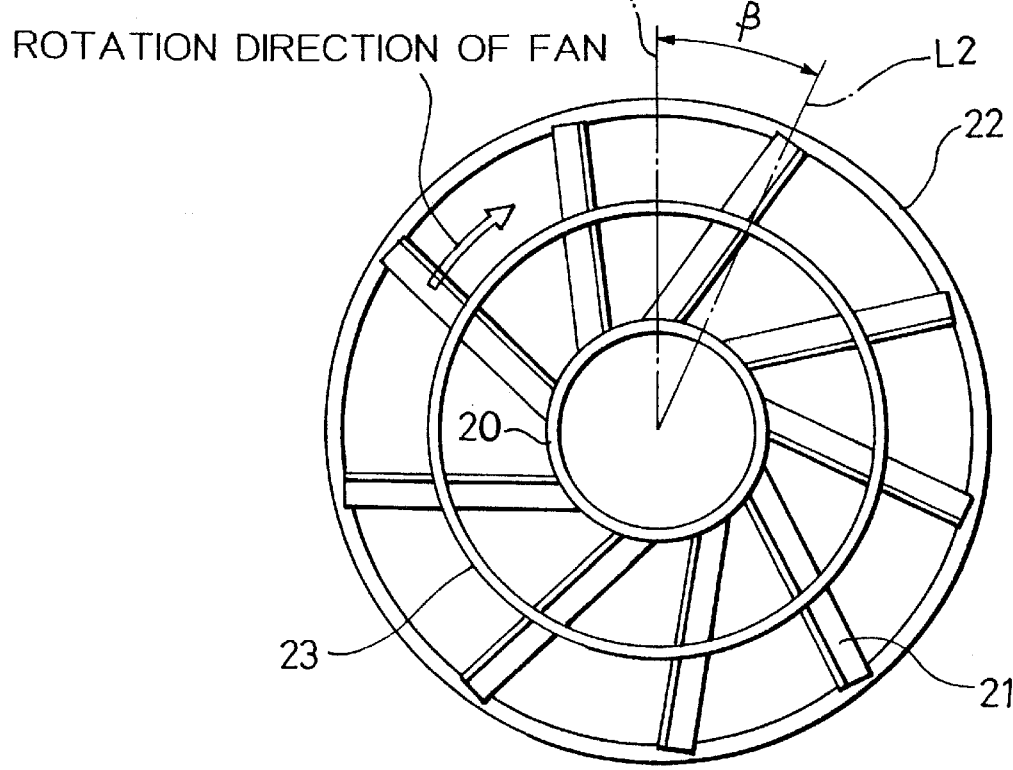
FIG. 14 is an illustration showing a modified embodiment of the airflow direction changing member.

FIG. 14 shows an embodiment in which the member 13 has a circular reinforcement rib 23 which is concentric with the fan rotation, so as to reinforce the fixed blades 21. When the shift angle is large, the overall length of the fixed blades 21 tends to be long, and the rib 23 effectively reinforces the fixed blades 21. This is especially important when the fixed blades 21 double as a means for securing the motor. The reinforcement rib 23 has a surface which is approximately conical (or frustoconical) so as to spread radially outward in the down-stream direction of the fan airflow, to promote the spread of the discharged air in the radial direction. Furthermore, the reinforcement rib 23 does not have to be a concentric circle shape as shown in FIG. 4, and it is not necessary for the rib 23 to be of any specific shape, so long as the structural strength of the fixed blades 21 is increased by connecting the fixed blades 21 with one another and the discharged air discharged by the fan is not greatly prevented from passing through.

As briefly mentioned above, FIG. 15 shows an embodiment in which the fixed blade 21 is formed with a wing-shaped cross section, so that there is an advantage that energy loss of the discharged air passing through the fixed blade is small.

Figure 16:
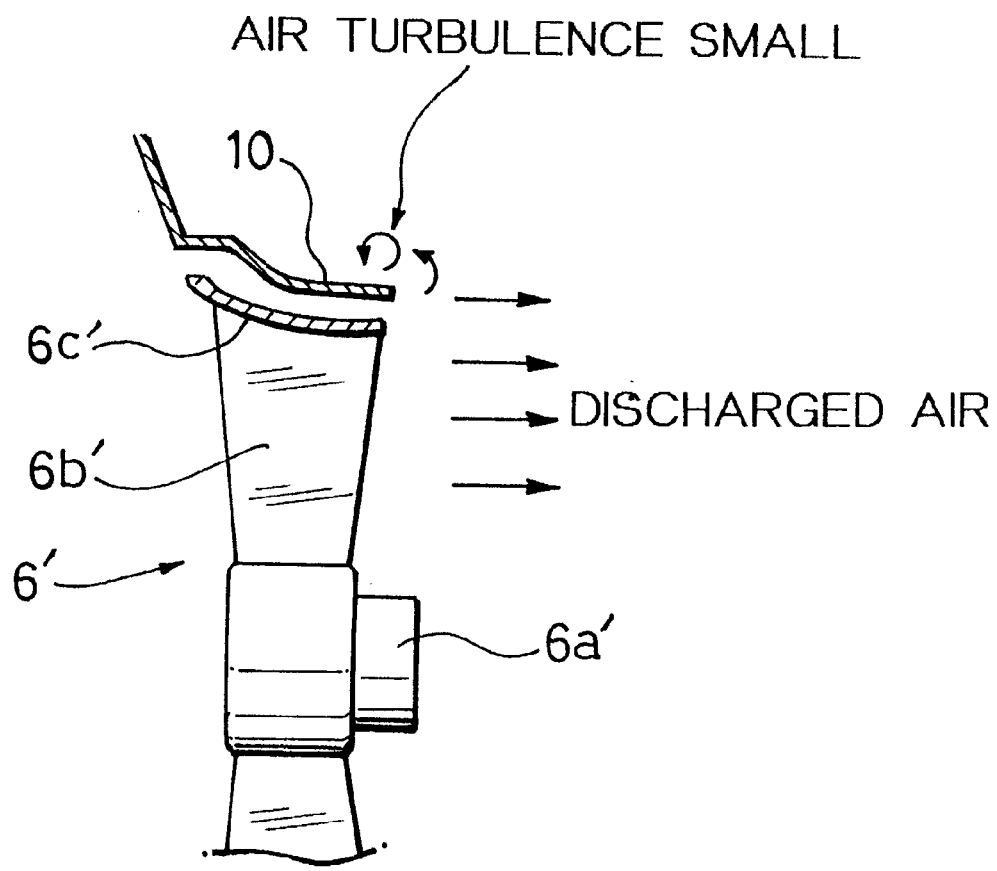
FIG. 16 is an illustration showing the relationship between a ring fan in which the present invention is adopted and a shroud, when a shroud covering rate K1 and a ring covering rate K2 are both large.
Figure 17:
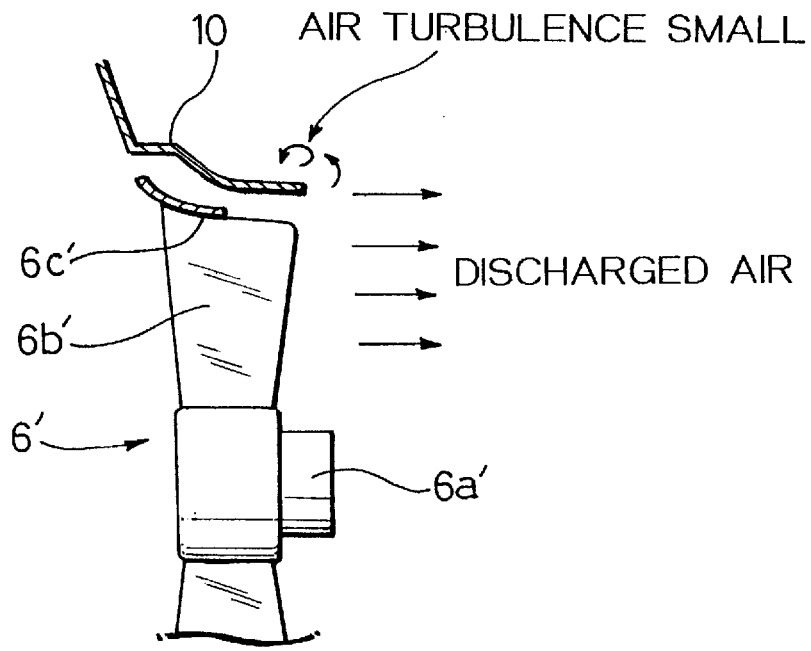
FIG. 17 is an illustration showing the relationship between a ring fan in which the present invention is adopted and a shroud, when the shroud covering rate K1 is large and the ring covering rate K2 is small.
Figure 18:
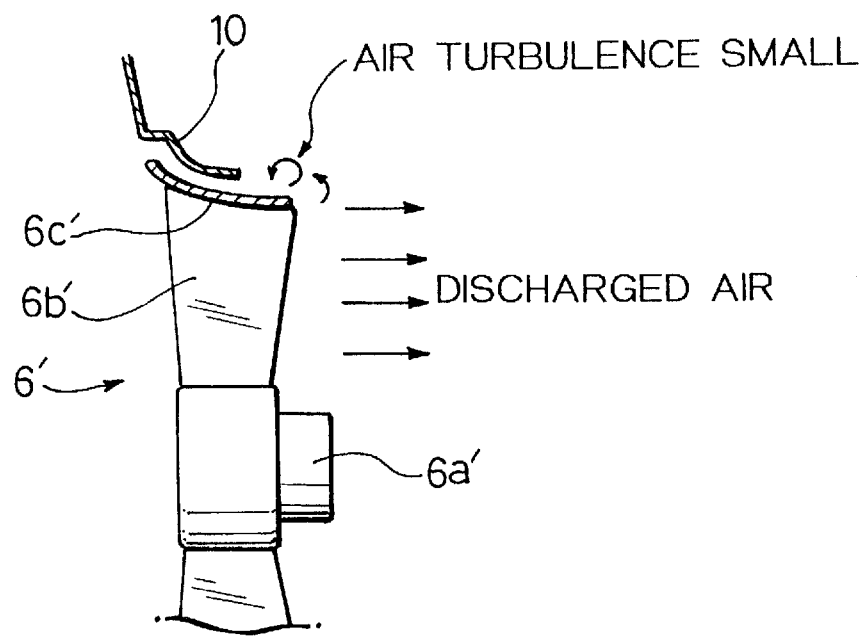
FIG. 18 is an illustration showing the relationship between a ring fan in which the present invention is adopted and a shroud, when the shroud covering rate K1 is small and the ring covering rate K2 is large.

FIGS. 16 through 18 show embodiments using the airflow direction changing member of the present invention with a device for introducing and discharging cooling air using a ring fan 6' having fan blades 6b' and a covering ring 6c'. FIG. 16 shows a case in which both the shroud covering rate (i.e. the axial proportion of the fan covered by the shroud 10) K1 and the ring covering rate (i.e. the axial proportions of the blades covered by the ring 6c') K2 are large (80% and over). FIG. 17 shows a case in which the shroud covering rate K1 is large (80% and over) and the ring covering rate K2 is small. FIG. 18 shows a case in which the shroud covering rate K1 is small and the ring covering rate K2 is large (80% and over).

As described above, according to the present invention, it is possible to provide features like low noise and high efficiency in a fan with a high covering rate and to reduce the influence an obstacle has on the discharged air, which is a problem in the prior fan with a high covering rate. In the present invention, in order to discharge the discharged air outward by the airflow direction changing member located behind the fan, the fan with high covering rate is adequate and, as a result, a large quantity of the airflow is gained and low noise is achieved.

What is claimed is:

1. A device for introducing cooling air through a heat exchanger and for discharging the cooling air, said device comprising:

a fan including rotatable blades rotatable about a rotation axis, and a fan motor operably coupled to said rotatable blades;

a shroud for forming an airflow passage from the heat exchanger to said fan;

an airflow direction changing member provided downstream of said fan;

wherein said airflow direction changing member comprises a center boss portion and a plurality of fixed blades having radially inner ends secured on said boss portion, said fixed blades radiate from said center boss portion in a generally radial direction, said fixed blades have radially outer ends fixed together in a circumferential series, and said fixed blades are fixed in position such that said rotatable blades are rotatable about said rotation axis relative to said fixed blades;

wherein each of said fixed blades has a shift angle constituted by an angle between a first datum line extending from a center of said boss portion through a center of said radially inner end of said fixed blade and a second datum line extending from said center of said boss portion through a center of a radially outer end of said fixed blade, said second datum line being circumferentially advanced relative to said first datum line in a rotation direction of said fan;

wherein each of said fixed blades has an attack angle constituted by an angle between a third datum line extending along a chord of an airflow directing surface of said fixed blade in the rotation direction of said fan and a datum surface extending along the rotation direction of said fan, such that said fixed blades redirect at least part of the cooling air discharged in an axial direction from said fan in an outward radial direction along said fixed blades;

wherein each of said fixed blades has a first portion extending along said first datum line from said radially inner end to a bend portion and a second portion extending from said bend portion on said first datum line to said radially outer end; and wherein said second portion constitutes at least 40% of an entire length of said fixed blade.

2. The device according to claim 1, wherein:

said airflow direction changing member further comprises a reinforcement ring fixed to said radially outer ends of said fixed blades.

3. The device according to claim 1, wherein:

said fan comprises a ring fan having a ring connecting in circumferential series radially outermost portions of said rotatable blades of said fan.

4. The device according to claim 3, wherein:

said shift angle is in a range of about 10° to about 60°.

5. The device according to claim 1, wherein:

said shift angle is in a range of about 10° to about 60°.

6. The device according to claim 1, wherein:

said attack angle is in a range of about 30° to about 70°.

7. The device according to claim 3, wherein:

said attack angle is in a range of about 30° to about 70°.

8. The device according to claim 1, wherein:

each of said fixed blades is wing-shaped in cross section.

9. The device according to claim 3, wherein:

each of said fixed blades is wing-shaped in cross section.

10. The device according to claim 1, wherein:

said airflow direction changing member is formed separately from said shroud.

11. The device according to claim 3, wherein:

said airflow direction changing member is formed separately from said shroud.

12. The device according to claim 1, wherein:
said airflow direction changing member is formed unitarily with said shroud.

13. The device for introducing and discharging cooling air according to claim 3, wherein:
said airflow direction changing member is formed unitarily with said shroud.

14. The device according to claim 1, wherein:
said airflow direction changing member is attached to said fan motor.

15. The device according to claim 3, wherein:
said airflow direction changing member is attached to said fan motor.

16. The device according to claim 1, wherein:
said shroud has an axial covering rate of at least 80% with respect to said fan.

17. The device according to claim 3, wherein said shroud has an axial covering rate of at least 80% with respect to said fan.

18. The device according to claim 1, wherein said air flow direction changing member includes a reinforcement rib fixed between said radially inner and outer ends of said fixed blades.

19. The device according to claim 3, wherein said air flow direction changing member includes a reinforcement rib fixed between said radially inner and outer ends of said fixed blades.

20. The device according to claim 1, wherein said first portion and said second portion are straight.

21. The device according to claim 3, wherein said first portion and said second portion are straight.

22. The device according to claim 1, wherein said air flow direction changing member is provided adjacently down stream to said fan.

23. A device for introducing cooling air through a heat exchanger and for discharging the cooling air, said device comprising:

a fan including rotatable blades rotatable about a rotation axis, and a fan motor operably coupled to said rotatable blades;

a shroud for forming an airflow passage from the heat exchanger to said fan;

an airflow direction changing member provided downstream of said fan;

wherein said airflow direction changing member comprises a center boss portion and a plurality of fixed blades having radially inner ends secured on said boss portion, said fixed blades radiate from said center boss portion in a generally radial direction, said fixed blades have radially outer ends fixed together in a circumferential series, and said fixed blades are fixed in position such that said rotatable blades are rotatable about said rotation axis relative to said fixed blades;

wherein each of said fixed blades has a shift angle constituted by an angle between a first datum line extending from a center of said boss portion through a center of said radially inner end of said fixed blade and a second datum line extending from said center of said boss portion through a center of a radially outer end of said fixed blade, said second datum line being circumferentially advanced relative to said first datum line in a rotation direction of said fan;

wherein each of said fixed blades has an attack angle constituted by an angle between a third datum line extending along a chord of an airflow directing surface of said fixed blade in the rotation direction of said fan and a datum surface extending along the rotation direction of said fan, such that said fixed blades redirect at least part of the cooling air discharged in an axial direction from said fan in an outward radial direction along said fixed blades; and wherein each of said fixed blades is straight from said radially inner end to said radially outer end.

24. The device according to claim 23, wherein said fan comprises a ring fan having a ring connecting in circumferential series radially outermost portions of said rotatable blades of said fan.

* * * * *